US008321554B2

(12) United States Patent
Dickinson (10) Patent No.: US 8,321,554 B2
(45) Date of Patent: Nov. 27, 2012

(54) SYSTEM AND PROGRAM TO AUTOMATICALLY IDENTIFY A SERVER ON WHICH TO DEPLOY AN APPLICATION

(75) Inventor: Yolanda Kay Dickinson, Denver, CO (US)

(73) Assignee: International Business Machines Corporation, Armonk, NY (US)

( * ) Notice: Subject to any disclaimer, the term of this patent is extended or adjusted under 35 U.S.C. 154(b) by 2509 days.

(21) Appl. No.: 11/016,101

(22) Filed: Dec. 17, 2004

(65) Prior Publication Data

US 2006/0136701 A1  Jun. 22, 2006

(51) Int. Cl.
*G06F 15/173* (2006.01)
*G06F 15/177* (2006.01)
*G06F 15/16* (2006.01)
*G06F 9/46* (2006.01)

(52) U.S. Cl. ........ 709/224; 709/220; 709/225; 709/226; 709/229; 718/100; 718/104; 718/105

(58) Field of Classification Search .................. 709/220, 709/224–226, 229; 718/100, 104–105
See application file for complete search history.

(56) References Cited

U.S. PATENT DOCUMENTS

| 5,774,668 | A | * | 6/1998 | Choquier et al. ............. 709/223 |
| 5,915,095 | A | * | 6/1999 | Miskowiec ................... 709/223 |
| 6,389,589 | B1 |  | 5/2002 | Mishra et al. .................. 717/11 |
| 6,606,658 | B1 | * | 8/2003 | Uematsu ....................... 709/225 |
| 6,862,623 | B1 | * | 3/2005 | Odhner et al. ................. 709/226 |
| 7,107,327 | B2 | * | 9/2006 | Kakadia ........................ 709/220 |
| 7,181,524 | B1 | * | 2/2007 | Lele .............................. 709/226 |
| 7,277,938 | B2 | * | 10/2007 | Duimovich et al. .......... 709/224 |
| 7,293,059 | B2 | * | 11/2007 | Pearson ........................ 709/201 |
| 2002/0004824 | A1 |  | 1/2002 | Cuan et al. ...................... 709/28 |
| 2002/0165864 | A1 |  | 11/2002 | Azagury et al. ................ 707/10 |
| 2003/0061247 | A1 |  | 3/2003 | Renaud ......................... 707/205 |
| 2003/0069945 | A1 |  | 4/2003 | Gregson |

FOREIGN PATENT DOCUMENTS

WO    02054244 A2    7/2002

OTHER PUBLICATIONS

INSPEC: (AN-7049539) INSPEC: (AN-6701421) Advances in Database Technology EDBT 2000. Proceedings of International Conference on Extending Database Tech. 7th KOnstanz, GE Mar. 27031, 2000.
ACM Digital Library: Bringing the Enterprise into a Database Systems Course—Moore, TK et al; 2002 FlexNet—A Flexible Component Oriented Middleware System—Hayton R. et al Financial Tech. Bulletin vol. 18, Issue 6 Date: Aug. 1, 2000 pp. 2.

* cited by examiner

*Primary Examiner* — David Lazaro
*Assistant Examiner* — Farzana Huq
(74) *Attorney, Agent, or Firm* — Arthur J. Samodovitz (57) ABSTRACT

A system, method and computer program product for determining one of a plurality of servers on which to install and execute an application. First program instructions obtain information from each of the plurality of servers as to amounts of availability of their respective CPUs, RAMs and storage. Second program instructions determine one or more of the servers which have sufficient CPU, RAM and storage to execute the application. Third program instructions determine a weight for each of the amounts for the one or more servers. Fourth program instructions sum together, for each of the one or more servers, the weights for their respective amounts of availability of the CPUs, RAMs and storage. Fifth program instructions determine which of the one or more servers has a highest sum, whereby the server with the highest sum is recommended to execute the application.

3 Claims, 7 Drawing Sheets

SYSTEM AND PROGRAM TO AUTOMATICALLY IDENTIFY A SERVER ON WHICH TO DEPLOY AN APPLICATION

BACKGROUND OF THE INVENTION

The invention relates generally to computer systems, and deals more particularly with a technique to automatically identify one of a multiplicity of servers which is best suited to deploy a new application.

Currently, when a decision is made to deploy a new application on a server or cluster of servers, an administrator checks the availability of resources (i.e. total availability of memory, storage and processor) on candidate servers, and whether the new application would be compatible with the programs (i.e. operating system, database application, Java application, web application, etc.) already resident on the candidate server. Then, the administrator installs the new application on one of the compatible servers with sufficient availability of resources.

It was known for the administrator to consider other, secondary factors as well. These can be considered along with the foregoing primary factors, or to choose between two or more candidate servers which have the requisite availability of resources and compatible, associated programs (i.e. is "qualified") to deploy the new application. The secondary factors consider the whether each qualifying server (a) is running another application for the same customer, (b) needs more applications to be profitable (when the server provider is paid based on application usage, (c) resides in a state or country that provides tax incentives, (d) provides other business reasons, (e) is currently operational, or (f) is targeted to be decommissioned or upgraded.

While the foregoing process is effective, it is somewhat subjective, and improvements are needed to the process of determining on which server to deploy a new application.

SUMMARY OF THE INVENTION

The invention resides in a system, method and computer program product for determining one of a plurality of servers on which to install and execute an application. First program instructions obtain information from each of the plurality of servers as to amounts of availability of their respective CPUs, RAMs and storage. Second program instructions determine one or more of the servers which have sufficient CPU, RAM and storage to execute the application. Third program instructions determine a weight for each of the amounts for the one or more servers. Fourth program instructions sum together, for each of the one or more servers, the weights for their respective amounts of availability of the CPUs, RAMs and storage. Fifth program instructions determine which of the one or more servers has a highest sum, whereby the server with the highest sum is recommended to execute the application.

According to features of the present invention, the first program instructions also obtain information whether each of the plurality of servers has one or more programs required by the application to function within each of the plurality of servers. Second program instructions determine the one or more servers which have sufficient resources and the one or more programs required by the application to function. The third program instructions quantify an average amount of availability of the CPU, RAM and storage within each of the one or more servers. Sixth program instructions obtain information of a financial reason to install the application on each of the one or more servers and determine a weight for the value of the financial reason in relation to the weights for the amounts of availability of the CPU, RAM and storage within each of the one or more servers.

The invention also resides in a system, method and computer program product for determining one of a plurality of servers on which to install and execute an application. First program instructions obtain information from each of the plurality of servers as to amounts of utilization of their respective CPUs at a multiplicity of sample times. Second program instructions obtain an estimate of amounts of CPU utilization of the application on each of the servers at the multiplicity of sample times. Third program instructions combine together, for each of the plurality of servers at each of the sample times, the amounts of utilization of their respective CPUs and the estimated amounts of CPU utilization of the application. The third program instructions also determine which of the plurality of servers on which to execute the application based in part on the respective combined amounts of utilization of their respective CPUs and the estimated amounts of CPU utilization of the application.

DETAILED DESCRIPTION OF THE PREFERRED EMBODIMENTS

Figure 1:
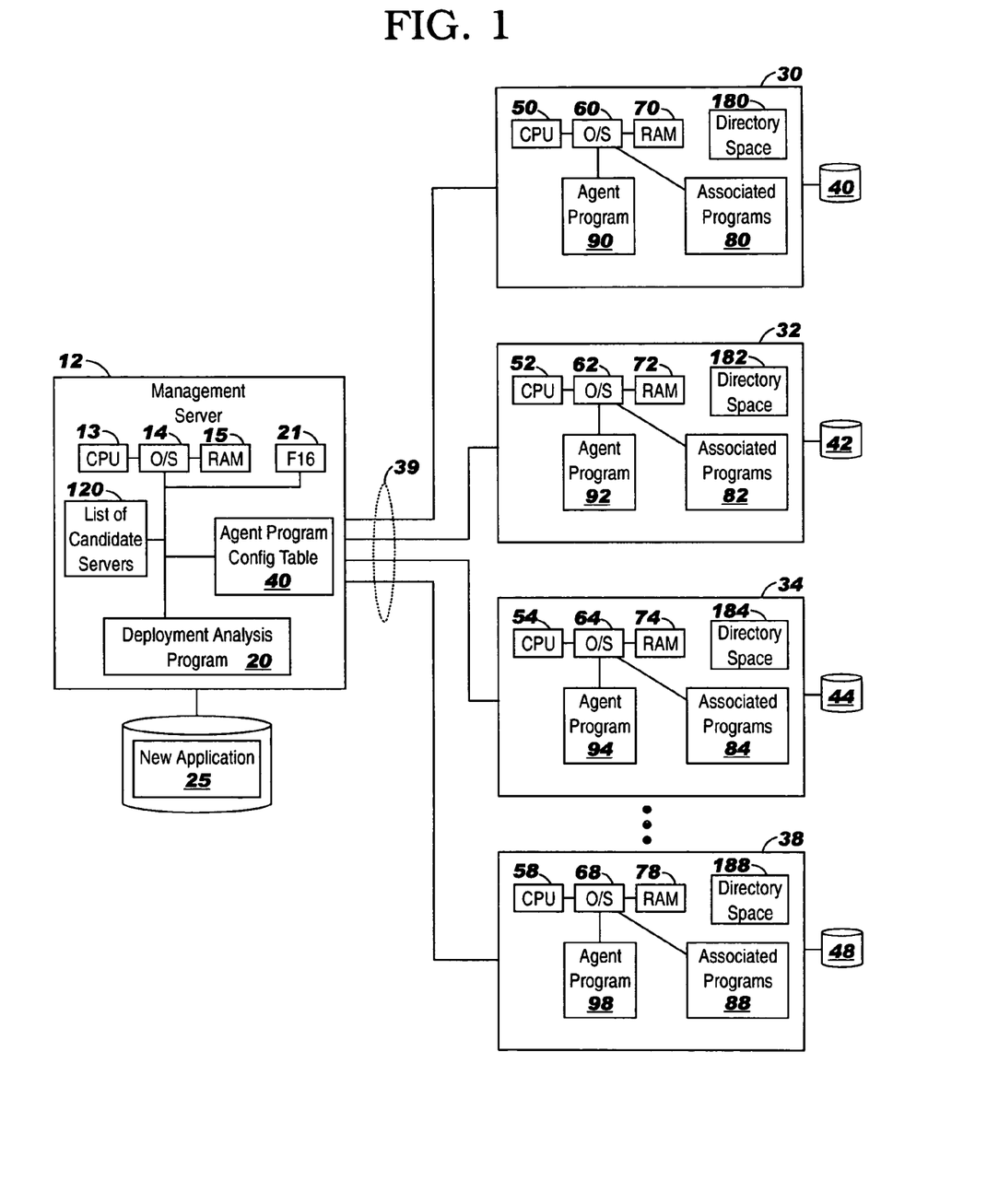
FIG. 1 is a block diagram of a computer system in which the present invention is incorporated.

The present invention will now be described in detail with reference to the figures. FIG. 1 illustrates a computer system generally designated 10 in which the present invention is incorporated. Computer system 10 comprises a management server 12 which includes a standard CPU 13, operating system 14, and RAM 15. Management server 12 executes a deployment analysis program 20 according to the present invention which identifies from a list of available servers 30, 32, 34 . . . 38 one or more qualified servers on which to deploy a new application and then initiates deployment of the new application on one of the qualifying servers. Management server 12 is coupled to servers 30, 32, 34 . . . 38 via one or more networks 39, such as the Internet. Each of the servers 30, 32, 34 . . . 38 includes a respective CPU 50, 52, 54 . . . 58, respective operating system 60, 62, 64 . . . 68, respective RAM 70, 72, 74 . . . 78, respective storage 40, 42, 44 . . . 48, respective directory space 180, 182, 184 . . . 188 (in either RAM or storage) and other respective programs 80, 82, 84 and 88 such as JAVA, middleware, web server or database which are associated with the new application. The "associated" program(s) on each server, if compatible with the new application, will interact with the new application if the new application is executed on that server. As explained in more detail below, agent programs 90, 92, 94 . . . 98 run on respective servers 30, 32, 34 . . . 38 to collect information about the respective servers as to availability of their resources and type and version of the associated programs. Analysis program 20 uses this information to determine which of the servers 30, 32, 34 . . . 38 is qualified to execute the new application so the new application can be deployed on that server.

Figure 2A:
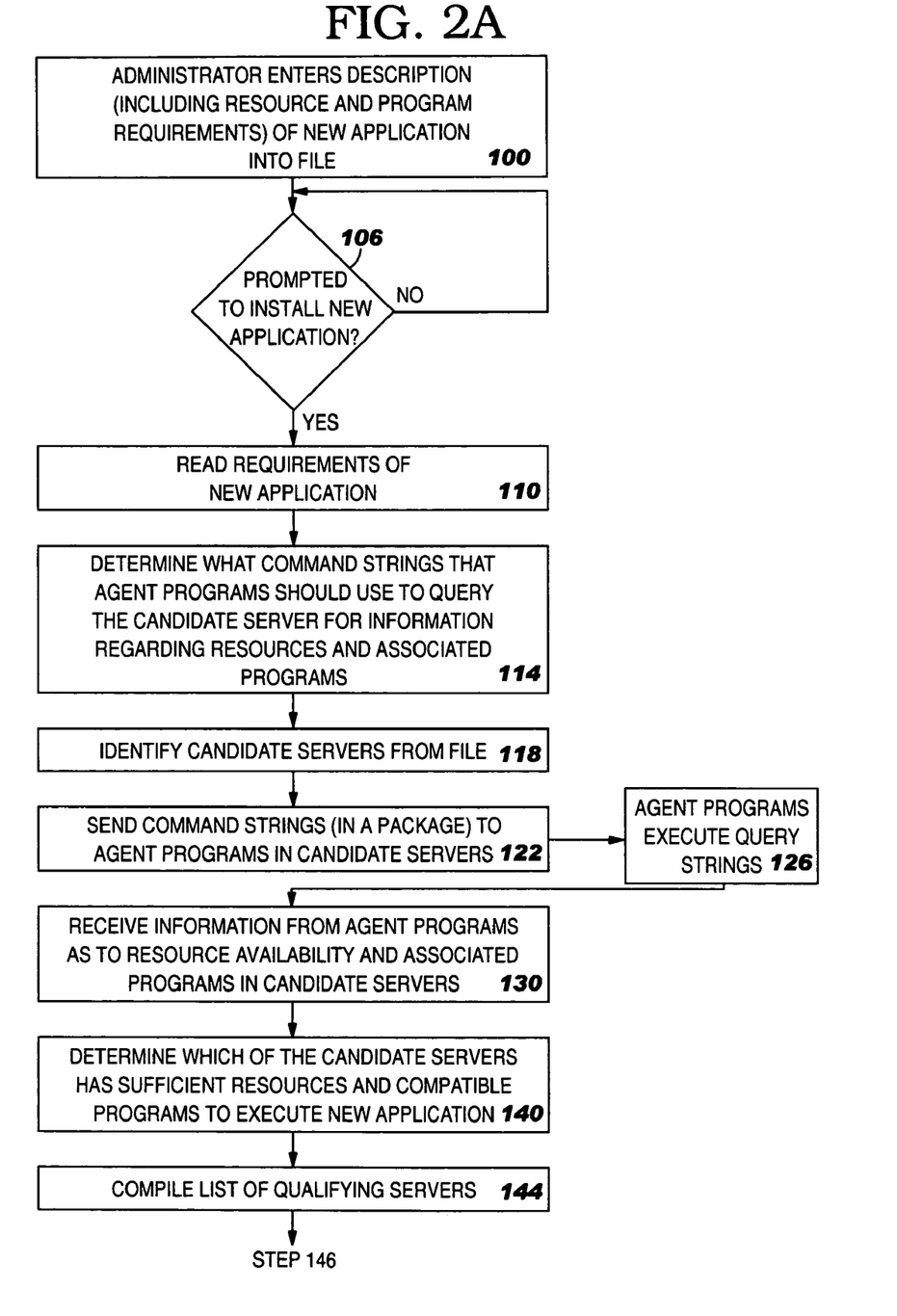
FIGS. 2(A) and 2(B) form a flow chart illustrating a program according to the present invention which identifies from a list of available servers one or more qualified servers on which to deploy a new application and then initiates deployment of the new application on one of the qualifying servers.
Figure 2B:
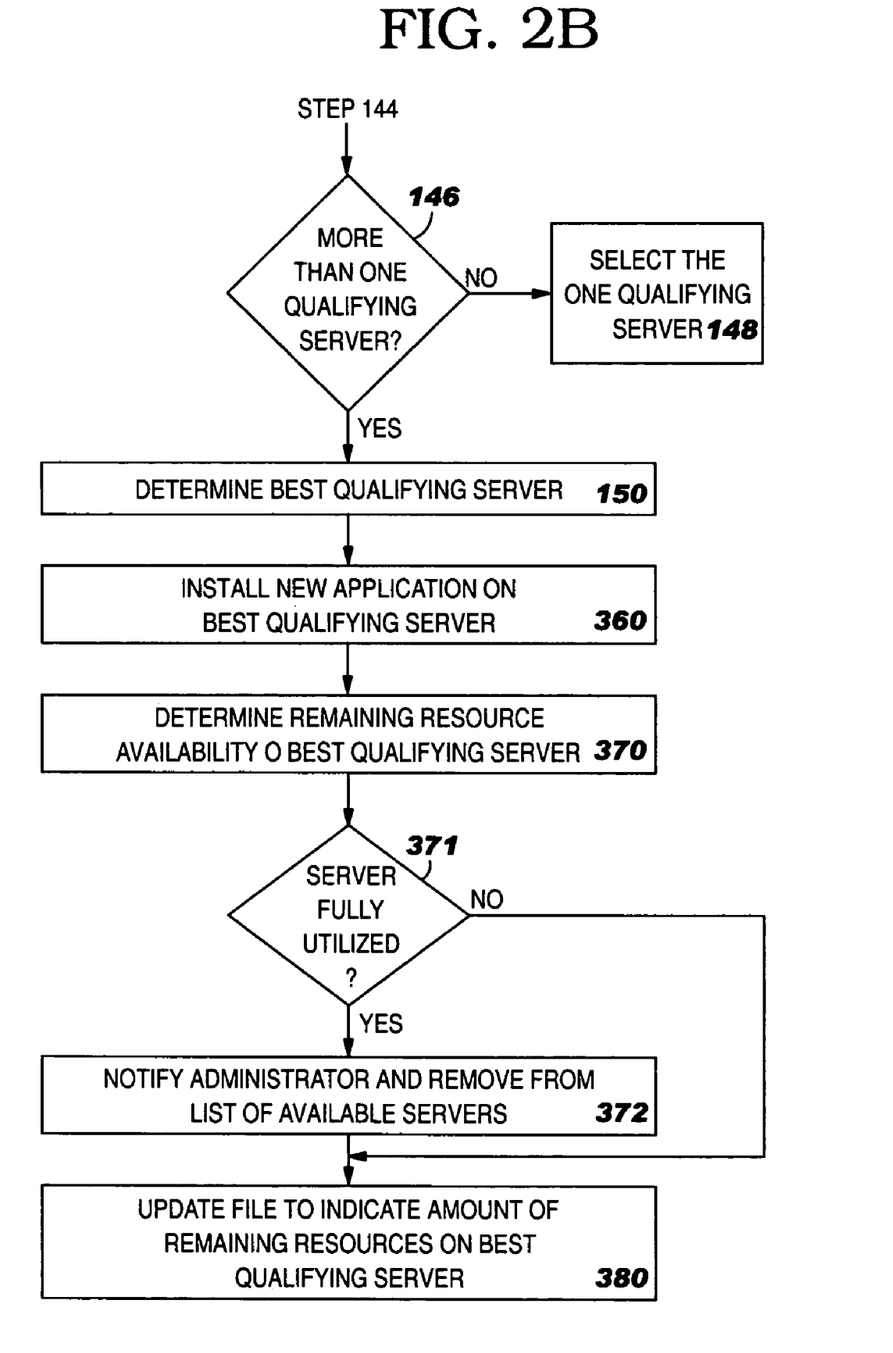

FIGS. 2(A) and 2(B) form a flow chart illustrating the function and operation of deployment analysis program 20 to identify one or more qualified servers on which to deploy a new application 25 and then initiates deployment of the new application on one of the servers. Prior to execution of program 20, a user enters into a file 21 a description of a new application 25 to be deployed (step 100). The description includes estimated resource requirements and requisite type and version of associated programs. The resource requirements are the average processor utilization, average memory utilization, average storage utilization, average directory space utilization, peak processor utilization and processor utilization as a function of time. The associated programs required for execution of the new application 25 may include type and version of operating system, database manager, JAVA application, middleware program, and web application or other programs. The description also identifies an owner of the new application 25, nature of the new application, contacts for the new application, etc. This latter information is for notification and other administrative functions.

Program 20 initiates the process to identify the server on which to deploy the new application either (a) automatically when the new application 25 is written into storage 30 (and notification sent to program 20) or (b) when an administrator enters a command to program 20 identify a server on which to deploy this new application 25 (step 106). After the server identification process is initiated, program 20 reads the requirements specification for the new application 25 from file 21 (step 110). Then, program 20 determines how to "equip" the agent programs 90, 92, 94 . . . 98 to obtain the information about the candidate servers 30, 32, 34 . . . 38 needed to assess their suitability to run the new application 25 (step 114). Program 20 makes this determination by comparing the requirements specifications for new application 25 to respective entries in an agent program configuration table 40. Table 40 includes one column for each possible application requirement for each type and amount of resource and each type and version of associated, compatible program. Table 40 also includes another, corresponding column for respective query command strings that each agent program needs to execute at the candidate server to gather the information about these requirements in the candidate server. For example, there is a query command string which queries the operating system in the candidate server for the amount of availability of CPU. There is another query command string which queries the operating system in the candidate server for the amount of availability of memory. There is another query command string which queries the operating system in the candidate server for the amount of availability of storage. There is another query command string which queries the operating system in the candidate server for the amount of availability of directory space. There is another query command string which queries the operating system in the candidate server for the version and type of the operating system. There is another query command string which queries the operating system in the candidate server for the version and type of database application (which will be associated with the new application 25). There is another query command string which queries the operating system in the candidate server for the version and type of JAVA application (which will be associated with the new application 25). There is another query command string which queries the operating system in the candidate server for the version and type of web application (which will be associated with the new application 25). By way of example, the queries are SQL based, although other query languages will suffice. Then, program 20 packages the requisite query strings so they can be sent to the agent programs in the candidate servers 30, 32, 34 . . . 38.

Next, program 20 determines which servers are candidates to install and execute the new application 25 (step 118). Program 20 makes this determination by reading a file 120 which contains a list of the candidate servers. File 120 is maintained as follows. Whenever a server is activated, an administrator or management program adds it to file 120 as a candidate server. Likewise, whenever a candidate server is deactivated, an administrator or management program removes it from file 120. Also, as explained in more detail below, when a server reaches capacity as to a critical resource such as processor, memory, directory space or storage, an administrator or program 20 removes it from file 120.

After identifying the candidate servers, program 20 sends the query string packages to the respective agent programs in the candidate servers for execution (step 122). Then, the agent program on each candidate server executes the query string to gather the information needed to determine if the candidate server has the requisite resource availability and associated programs for the new application. By way of example, each agent program is a known IBM Tivoli JAC program or IBM Security Compliance Manager program, although other agent programs such as SystemTool Hyena™ program (which works on Microsoft Windows products) will suffice. Using the query strings, the agent program on each candidate server obtains the information about availability of the requisite resources (processor, memory, directory space, storage etc.) and the type and version level of the requisite associated programs (i.e. operating system, database, JAVA, web and other applications associated with the new application, etc.) currently running on the server (step 126). The agent programs (by execution of the query strings) obtain this information either by direct access to files which contain the information or query to the operating system in the candidate server to access files which contain the information. After obtaining the requisite information about resources and associated programs in the candidate servers, the respective agent programs report the information back to program 20, and program 20 collects the information about each candidate server (step 130).

Then, for each candidate server, program 20 compares the resource availability and program type and version information collected from the respective agent program to the application requirements obtained from file 21 to determine if the server has the requisite resource availability and associated program type and version to host the new application (step 140). For example, if the application specification requires an average of one MIP of CPU, ten megabytes of memory, and one hundred megabytes of storage, and there are averages of one or more MIPs available, ten or more megabytes of memory available and one hundred megabytes or more of storage available, then the candidate server has sufficient processor to host the new application. If the application specification requires Microsoft Windows 2002 version 3 or later and IBM DB2 version 2 or later and the candidate server has Microsoft Windows 2002 version 3 or later and IBM DB2 version 2 or later, then the server has a compatible operating system and database software. After comparing the resource availability and program type and version to the new application requirements for each candidate server, program 20 compiles a list of servers which have the requisite resources and associated programs (step 144).

If there is a single server which qualifies (decision 146, no branch), then program 20 selects that server to host the new application (step 148). However, if more than one server qualifies, i.e. has sufficient resource availability and compatible, associated programs (decision 146, yes branch), program 20 determines and reports the best server on which to deploy the new application (step 150). This determination is based on the following primary characteristics of each qualifying server: amount of average available CPU, amount of average available memory, amount of average available directory space, amount of average storage, and combined peak requirements of CPU for both the existing application(s) and new application as a function of time. In general, the greater the amount of available average CPU, memory, directory space and storage and peak CPU, the more desirable the server to host the new application. The lower the combined peak CPU utilization (from both the existing application(s) and new application), the more desirable the server to host the new application. This determination of the best server (amongst two or more qualifying servers) on which to deploy the new application can also be based on secondary factors such as tax savings and other financial incentives for hosting the new application on the qualifying server.

Figure 3A:
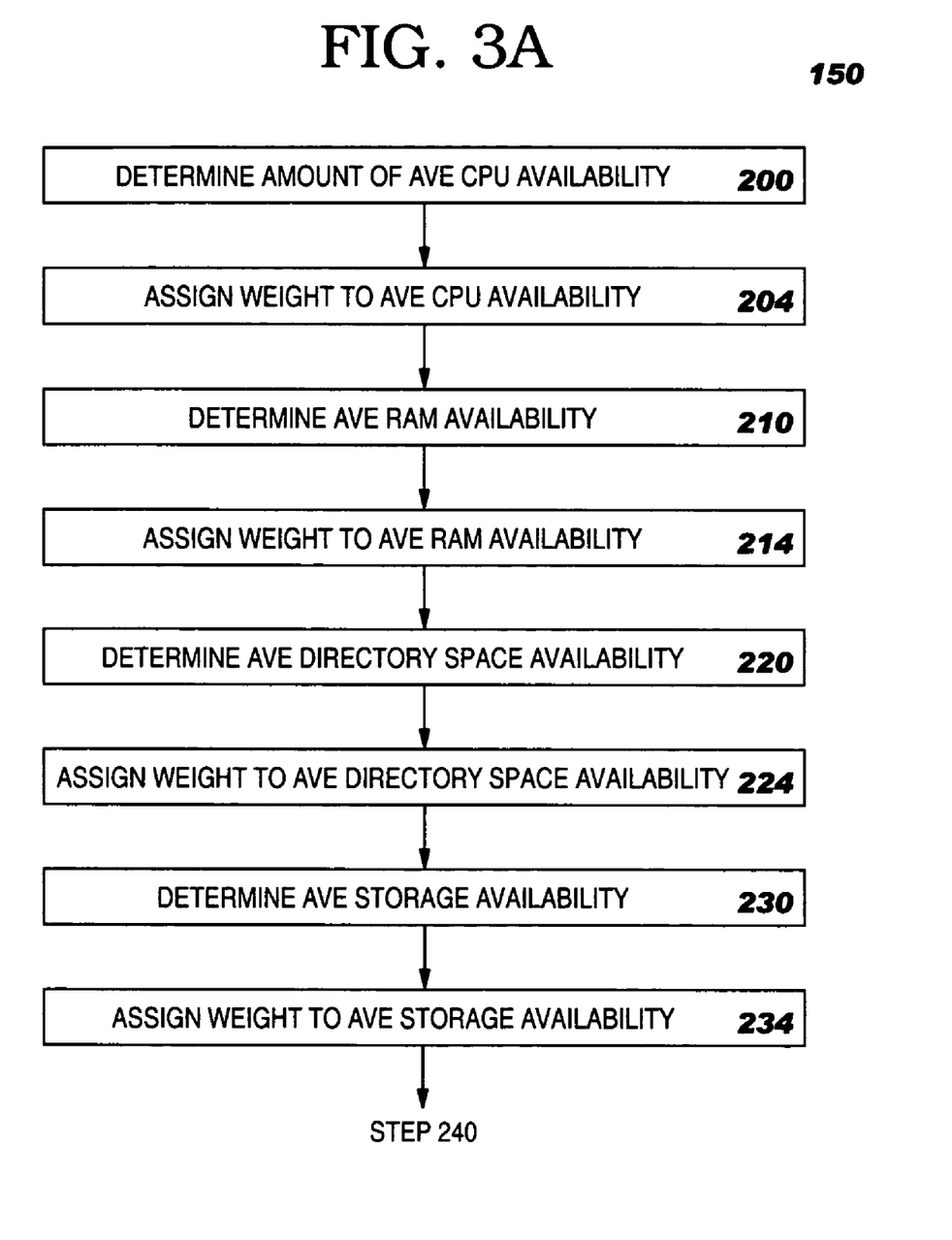
FIGS. 3(A) and 3(B) form a flow chart illustrating a function, according to one embodiment of the present invention, within the program of FIGS. 2(A) and 2(B) which determines which one of a plurality of qualified servers on which to deploy the new application.
Figure 3B:
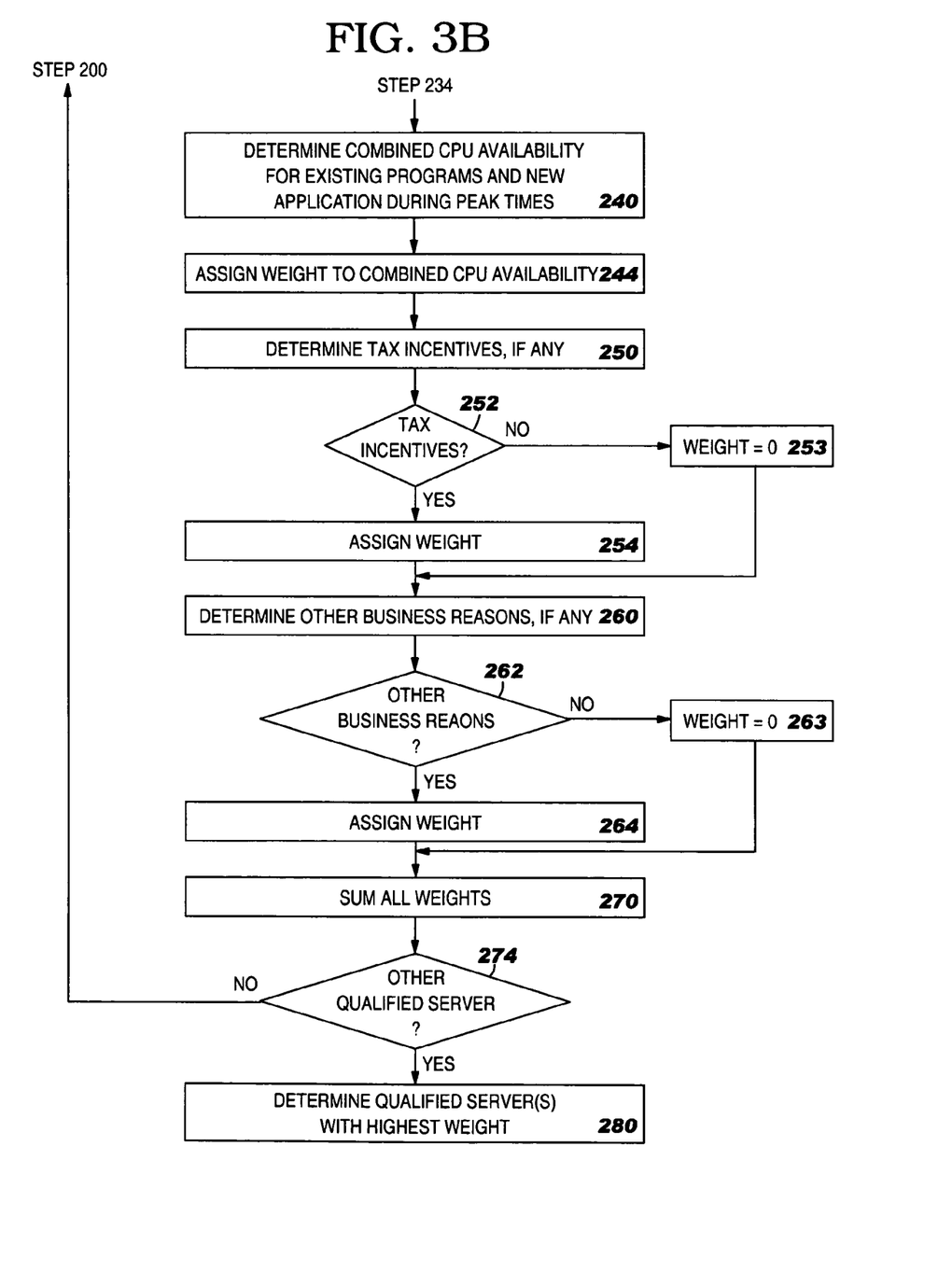

FIGS. 3(A) and 3(B) form a flow chart illustrating one embodiment of step 150 where all of the foregoing factors are considered for the qualified servers, although more weight is assigned for the primary factors than the secondary factors. The following steps are performed for each qualified server. In step 200, program 20 determines the amount of average available CPU. Then, program 20 assigns a weight to this amount, where the weight is proportional to the amount either linearly or step wise (step 204). In step 210, program 20 determines the amount of average available RAM. Then, program 20 assigns a weight to this amount, where the weight is proportional to the amount either linearly or step wise (step 214). Then, program 20 assigns a weight to this amount, where the weight is proportional to the amount either linearly or step wise (step 224). In step 230, program 20 determines the amount of average available storage. Then, program 20 assigns a weight to this amount, where the weight is proportional to the amount either linearly or step wise (step 234). In step 240, program 20 determines the amount of available CPU during peak usage by both the existing programs (based on past history) and new application (based on estimation). Then, program 20 assigns a weight to this amount, where the weight is proportional to the amount either linearly or step wise (step 244). In step 250, program 20 determines from a file (maintained by an accountant or other financial person) if there is a tax incentives to add the new application to the qualifying server. For example, the qualifying server may reside in a state or country which offers a tax incentive directly or indirectly related to deployment of an application on the qualifying server. The indirect tax incentive may be for the personnel required to operate the qualifying server or the additional capital investment in the qualifying server. If there is no tax incentives (decision 252, no branch), then program 20 assigns a weight of zero to this factor (step 253). If so (decision 252, yes branch), program 20 assigns a weight to this tax savings or other financial reason, where the weight is proportional to the amount of the tax savings, either linearly or step wise (step 254). In step 260, program 20 determines from a file (maintained by an accountant or other financial person) if there is another business reason to add the new application to the candidate server. If there are no other business reasons (decision 262, no branch), then program 20 assigns a weight of zero to this factor (step 263). If there is another business reason (decision 262, yes branch), program 20 assigns a weight to this business reason, where the weight is proportional to the value of the business reason, either linearly or step wise (step 264). Then, program 20 sums the weights for the server (step 270). If desired, less than all of the foregoing factors can be considered in selecting one of the qualifying servers to host the new application. Then, program 20 determines if there are other qualifying servers for which to conduct the foregoing analysis of steps 200-270 (decision 274). If so (decision 274, yes branch), then the foregoing steps 200-270 are repeated for another qualifying server.

After the foregoing steps 200-274 are performed for each qualifying server, program 20 determines the qualifying server with the highest score (step 280). This is the "best" server to host the new application. If there is a "tie" for the highest score, then the administrator can select one based on any other factors known to the administrator.

The following is an example of specific weights assigned to each of the foregoing factors, although the precise weights are not critical to the present invention.

One factor is the average amount of availability of RAM. The greater the availability the higher the weighting factor which translates to a greater amount of attractiveness of the respective server to host the new application.

RAM availability<256 Mbytes: flag server for being full and unavailable for the new application. (This would have disqualified the candidate server in step 140.)

256 Mbytes<RAM availability<512 Mbytes: server available, weight (RAM)=1

512 Mbytes<RAM availability<1024 Mbytes: server available, weight (RAM)=2

RAM availability>1024 Mbytes: server available, weight (RAM)=3

Another factor is the average amount of availability of CPU (or percent under-utilization of the CPU). The greater the availability (or lower the percent utilization of the CPU), the higher the weighting factor which translates to a greater amount of attractiveness of the respective server to host the new application.

CPU average utilization>90%: flag server for being full and unavailable for the new application. (This would have disqualified the candidate server in step 140.)

70%<CPU average utilization<90%: server available, weight (ave. CPU)=1

50%<CPU average utilization<70%: server available, weight (ave. CPU)=2

25%<CPU average utilization<50%: server available, weight (ave. CPU)=3

CPU average utilization<25%: server available, weight (ave. CPU)=4

Another factor is the average amount of availability of directory space. The greater the availability (or lower the percent utilization of directory space), the higher the weighting factor which translates to a greater amount of attractiveness of the respective server to host the new application.

Directory space average utilization>80%: flag server for being full and unavailable for the new application. (This would have disqualified the candidate server in step 140.)

50%<Directory space average utilization<80%: server available, weight (Directory space)=1

25%<Directory space average utilization<50%: server available, weight (Directory space)=2

−Directory Space average utilization<25%: server available, weight (Directory space)=3

Another factor is the combined amount of peak CPU usage due to execution of the existing applications and the estimated amount of peak CPU usage due to prospective execution of the new application. This determination is made as a function of time. To collect the data for this factor, tool 20 periodically samples the total existing CPU utilization (as a percentage), such as every fifteen minutes, and records the utilization and sample time. An administrator enters similar, estimated information as a function of time for the new application 25 based on past experience with this application on other servers or knowledge of the CPU requirements of the new application and when the new application is most heavily used. For example, some applications are routinely run at the end of a month or quarter. Other applications are routinely run at the end of a business day, such as at 5 PM. The administrator can estimate the CPU requirements of the application as a function of time based on the estimated number of transactions, estimated amount of data to be transferred, etc.

Prospective combined CPU peak utilization (*t*)=existing application(s) CPU peak usage (*t*)+new application CPU peak usage (*t*).

From the samples and estimate, tool 20 determines the time when the prospective combined CPU peak utilization ("Combined peak CPU utilization") is greatest and the prospective combined CPU peak utilization at that time. Tool 20 makes this determination by adding the existing application(s) CPU usage and new application's estimated CPU usage at each sampling time.
Combined peak CPU utilization>95%: flag server for being full and unavailable for the new application. (This would have disqualified the candidate server in step 140.)
85%<Combined peak CPU utilization<95%: server available, weight (peak CPU)=1
50%<Combined peak CPU utilization<85%: server available, weight (peak CPU)=2
Combined peak CPU utilization<50%: server available, weight (peak CPU)=3

Other, secondary, factors in selecting a server to host the new application are business in nature. The following is more detail about these secondary business factors and weights assigned to them:

One secondary, business reason to deploy the new application on the qualifying server is a state or country tax incentive which is directly or indirectly associated with deployment of the new application on the qualifying server. For example, deployment of the new applications in the country may require extra support personnel for which the tax incentive may apply. As another example, deployment of the new application may result in extra revenue for the server site for which the tax incentive may apply. The tax incentive ("T1") is associated with a weight commensurate with the magnitude of the tax incentive. The following is a specific example of the weight corresponding to the tax incentive:

Tax savings>$2,000. weight(tax)=1

$1,000<Tax savings<$2,000. weight(tax)=0.5

Tax savings<$1,000. weight (tax)=0

Another secondary, business reason to deploy the new application on the candidate server is return on investment, in those business models where the server supplier is not paid for the server itself, but instead is paid for usage of applications that run on the server. Return on investment for each server as determined by accountant or an IBM Project Management (PM) Office program, based on cost in supplying and maintaining the server compared to the usage fees paid by the customer, overall server utilization quotas (i.e. the number of applications that can run on one server) and ceiling limits on upgrading the server. Generally, the more the usage of the server by applications, the greater the return on investment. By way of example, it may be desirable in some business models, for all servers to have a positive return on investment, so the servers with the lower ROIs are assigned the greater weights, such as the following:

ROI<0. weight (ROI)=0.5

0<ROI<0.5. weight (ROI)=0.2

ROI>0.5. weight (ROI)=0

Another secondary, business reason (in addition to ROI or as an alternate to ROI) to deploy the new application on the qualifying server is cost per index ("CPI"), in those business models where the server supplier is not paid for the server itself, but instead is paid for usage of applications that run on the server. CPI indicates whether the amount of hardware resource usage (i.e. CPU, RAM, disk space, etc.) or number of deployed applications (with average resource usage) on the server is great enough so that payment for resource usage (and other benefits from deployment of the new application) exceeds the cost of server as borne by the supplier. "CPI" differs from "ROI" in that CPI also considers some nontraditional values realized by the server supplier for deploying the new application on the qualifying server. For example, if the new application is a leading edge application, deployment of this application may give the server/application supplier "public relations/goodwill" value or provide advertisement value. As another example, deployment of the new application on the server may promote license of other, related applications or deployment of additional, related servers. A CPI of "1" indicates break even. A CPI of <1 indicates less payment or other value for the server than the supplier's cost. A CPI of >1 indicates greater payment and value for the server than the supplier's cost. By way of example, it may be desirable in some business models for all servers to have a CPI>1, so the servers with the lower CPIs are assigned the greater weights, such as the following:

CPI<1. weight (CPI)=0.5

CPI>1. weight (CPI)=0

CPI=1. weight (CPI)=0

A schedule per index ("SPI") indicates when the CPI for the server is planned to be >1. By way of example, it may be desirable for all servers to be on schedule or ahead of schedule to have a CPI>1, so the servers that are furthest behind schedule can be assigned the greater weights, such as the following:

SPI behind schedule. weight(SPI)=0.5

SPI on schedule. weight(SPI)=0

Figure 4A:
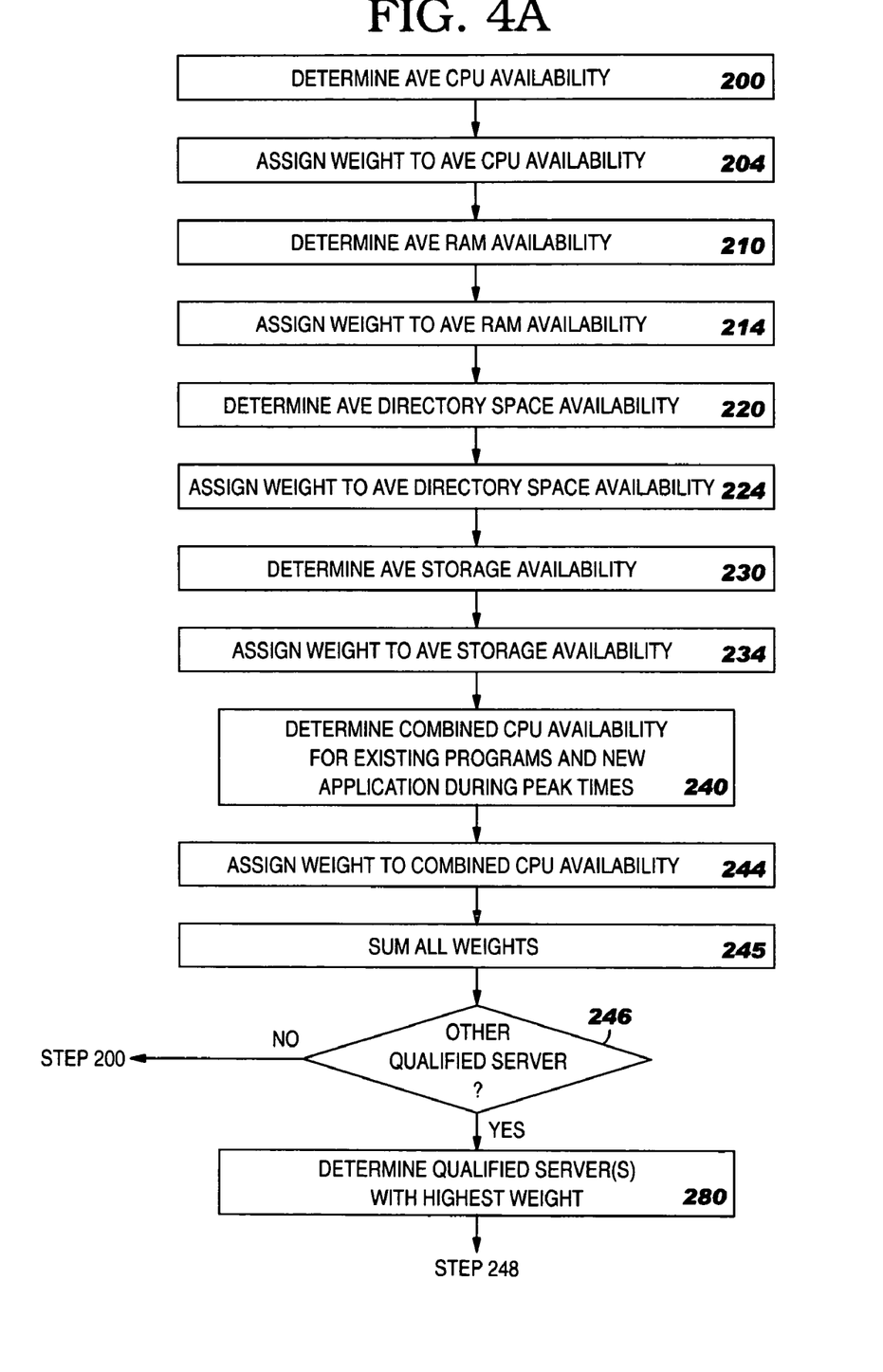
FIGS. 4(A) and 4(B) form a flow chart illustrating a function, according to another embodiment of the present invention, within the program of FIGS. 2(A) and 2(B) which determines which one of a plurality of qualified servers on which to deploy the new application.
Figure 4B:
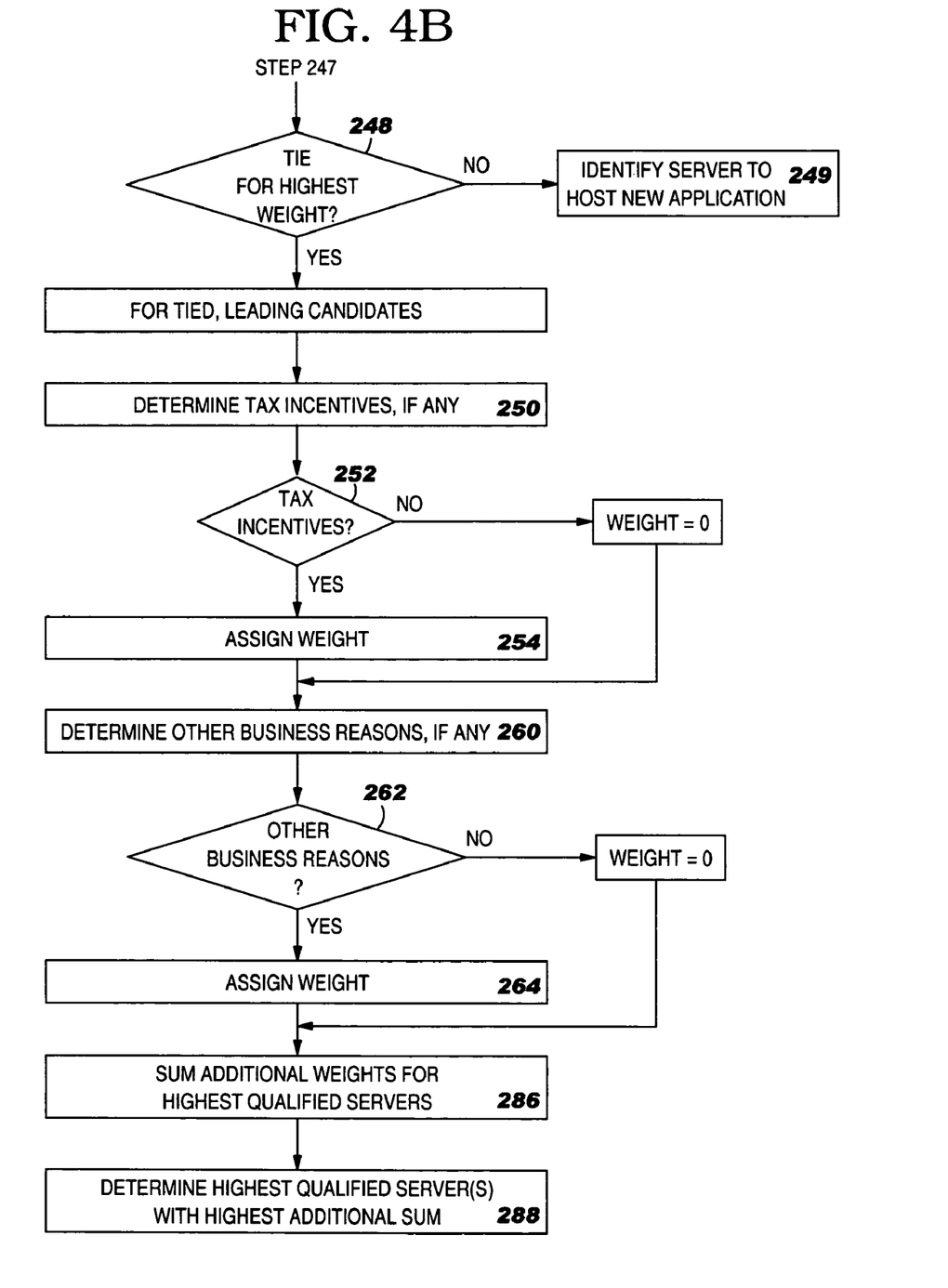

FIGS. 4(A) and 4(B) form a flow chart illustrating another embodiment of step 150 where the following, primary factors for each qualifying server are first considered and weights assigned as described above: amount of average available CPU, amount of average available memory, amount of average available directory space, amount of average storage, combined peak requirements of CPU for both the existing application(s) and new application as a function of time. The foregoing analysis in the process of FIGS. 4(A) and 4(B) is the same as steps 200-244 of FIGS. 3(A) and 3(B). Then, the weights for each of these primary factors for the qualified server are tallied (step 245). If there are other qualified servers yet to be considered (decision 246, yes branch), then the foregoing steps 200-245 of FIGS. 4(A) and 4(B) are repeated for another qualified server (step 246). Then, program 20 determines the qualified server(s) with the highest score (step 247). If there is just one with the highest score, then program 20 selects that qualified server to host the new application (step 249). However, there may be a tie for highest score, especially when a group of new servers is first deployed, because all of these servers may all have the same base programs, i.e. operating system, middleware, web application, database manager etc. that all utilize the same amount of CPU, RAM, storage and directory space. If there is more than one qualified server with the highest score based on the primary factors (decision 248, yes branch), then the following secondary factors are considered and weights assigned as described above for the highest qualified servers: tax incentives, ROI, CPI and SPI. The consideration of the secondary factors in the process of FIGS. 4(A) and 4(B) is the same as steps 250-264 of FIGS. 3(A) and 3(B). Then, the weights for the secondary factors for each of the highest qualified servers are combined to determine the best qualified server to host the new application (step 286). Then, program 20 determines the highest qualified server with the highest score as the best server to host the new application (step 288).

After a server is selected in step 150 (by the steps of FIGS. 3(A) and 3(B), FIGS. 4(A) and 4(B) or a variation thereof) to host the new application 25, the new application is installed on the selected server (step 360 of FIG. 2(B)). The installation can be performed in a variety of manners (step 360). In one scenario, program 20 downloads to the selected server a software "package" which includes the new application 25 and an installation tool. The installation tool modifies the configuration of the selected server to support the new application, and then loads the new application into the selected server for execution. The modifications to the configuration may include: proxy statements, runtime for middleware, database and JCA/JMS (J2EE Connection Architecture and JAVA Messaging Services). In another scenario, program 20 downloads a configuration file to support the new application 25, and a script program which executes in the selected server. The script program (a) installs the new configuration file, (b) fetches the new application 25 from a remote web site and (c) loads the new application into the selected server for execution. This completes the deployment of the new application 25.

After the new application is deployed, program 20 determines the amount of available resources (average and peak processor, average memory, average storage, average directory space, etc.) remaining on the selected server after deployment of the new application (step 370). This determination is made by subtracting from the availability of each of the resources previously reported by the agent program for the selected server the resource requirements of the new application. If the remainder of any of the resources is less than a predetermined threshold for this resource (decision 371, yes branch), then program 20 determines that the selected server is no longer available to host any other new application and removes the selected server from file 120 (step 372). Program 20 also sends an e-mail to a person responsible for managing the selected server to indicate that at least one resource of the selected server is fully utilized (step 372). The e-mail also identifies which resource(s) are fully utilized. This person can then accept this condition, i.e. make no changes to the selected server and not add any additional applications to the selected server, or in some cases, add additional resources of the type that was fully utilized. For example, if the processor or memory was fully utilized, the person may be able to add an additional processor or memory by insertion of a processor or memory card. In other cases, the person may be able to activate additional processor or memory currently resident on the selected server but not yet activated.

Next, program 20 updates file 120 to indicate which server was selected to run the new application, the description of the server, i.e. type and version of programs on the server, owner of server, contact for server, etc. and date of deployment, and the amount of remaining resources on the server (step 380). Also, program 20 sends an e-mail to interested people indicating that the new application was successfully deployed and including the foregoing description of the server and date of deployment of the new application (step 380).

Based on the foregoing, a system, method and program for identifying a server which has sufficient resources and compatible, associated programs to deploy a new application, have been disclosed. However, numerous modifications and substitutions can be made without deviating from the scope of the present invention. For example, a different server statistics gathering program can be used. Also, different technical and business weights can be used as well as which ones are used to break ties in the embodiment of FIGS. 4(A) and (B). Therefore, the present invention has been disclosed by way of illustration and not limitation, and reference should be made to the following claims to determine the scope of the present invention.

The invention claimed is:

1. A computer program product for determining one of a plurality of servers on which to install and execute an application, said program product comprising:
 a computer readable tangible storage device;
 first program instructions to obtain information from each of said plurality of servers as to amounts of availability of their respective CPUs, RAMs and storage;
 second program instructions to determine one or more of said servers which have sufficient CPU, RAM and storage to execute said application;
 third program instructions to determine a weight for each of said amounts for said one or more servers;
 fourth program instructions to sum together, for each of said one or more servers, the weights for their respective amounts of availability of said CPUs, RAMs and storage;
 fifth program instructions to determine which of said ofie or more servers has a highest sum, Whereby said server with the highest sum is recommended to execute said application; and
 sixth program instructions to obtain information of a financial reason to install said application on each of said one or more servers and determine a weight for the value of said financial reason in relation to the weights for said amounts of availability of said CPU, RAM and storage within each of said one or more servers; and wherein said first, second, third, fourth, fifth and sixth program instructions are recorded on said computer readable tangible storage device and executed by a computer.

2. A system for determining one of a plurality of servers on which to install and execute an application, said system comprising:
 means for obtaining information from each of said plurality of servers as to amounts of availability of their respective CPUs, RAMs and storage;
 means for determining one or more of said servers which have sufficient CPU, RAM and storage to execute said application;
 means for determining a weight for each of said amounts for said one or more servers;

means for summing together, for each of said one or more servers, the weights for their respective amounts of availability of said CPUs, RAMs and storage;

means for determining which of said one or more servers has a highest sum, whereby said server with the highest sum is recommended to execute said application; and means for obtaining information of a financial reason to install said application on each of said one or more servers and determine a weight for the value of said financial reason in relation to the weights for said amounts of availability of said CPU, RAM and storage within each of said one or more servers.

3. A method for determining one of a plurality of servers on which to install and execute an application, said method comprising the steps of:

obtaining information from each of said plurality of servers as to amounts of availability of their respective CPUs, RAMs and storage;

determining one or more of said servers which have sufficient CPU, RAM and storage to execute said application;

determining a weight for each of said amounts for said one or more servers;

summing together, for each of said one or more servers, the weights for their respective amounts of availability of said CPUs, RAMs and storage;

determining which of said one or more servers has a highest sum; and obtaining information of a financial reason to install said application on each of said one or more servers and determine a weight for the value of said financial reason in relation to the weights for said amounts of availability of said CPU, RAM and storage within each of said one or more servers.

* * * * *